(12) United States Patent
Nishimoto et al.

(10) Patent No.: US 12,290,078 B2
(45) Date of Patent: May 6, 2025

(54) INTERNAL AIR ADJUSTMENT DEVICE

(71) Applicant: DAIKIN INDUSTRIES, LTD., Osaka (JP)

(72) Inventors: Motomi Nishimoto, Osaka (JP); Naohiro Tanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 719 days.

(21) Appl. No.: 17/568,228

(22) Filed: Jan. 4, 2022

(65) Prior Publication Data

US 2022/0125064 A1 Apr. 28, 2022

Related U.S. Application Data

(63) Continuation of application No. PCT/JP2020/026842, filed on Jul. 9, 2020.

(30) Foreign Application Priority Data

Jul. 10, 2019 (JP) .................................. 2019-128406

(51) Int. Cl.
*A23B 7/148* (2006.01)
*A23B 7/152* (2006.01)
*B01D 53/30* (2006.01)

(52) U.S. Cl.
CPC .............. *A23B 7/148* (2013.01); *A23B 7/152* (2013.01); *B01D 53/30* (2013.01)

(58) Field of Classification Search
CPC ......... A23B 7/144; A23B 7/148; A23B 7/152; A23B 7/04; A01F 25/14; F25D 11/003; F25D 17/042; F25D 17/067; B01D 53/30

(Continued)

(56) References Cited

U.S. PATENT DOCUMENTS 5,791,236 A * 8/1998 Schouten ............... A23B 7/148
99/468
7,866,258 B2 * 1/2011 Jorgensen .............. A23B 7/144
99/473

(Continued)

FOREIGN PATENT DOCUMENTS

CN 104602926 A 5/2015
EP 3 673 748 A1 7/2000

(Continued)

OTHER PUBLICATIONS

English translation of the International Preliminary Report on Patentability and Written Opinion of the International Searching Authority for International Application No. PCT/JP2020/026842, dated Jan. 20, 2022.

(Continued)

*Primary Examiner* — Reginald Alexander
(74) *Attorney, Agent, or Firm* — Birch, Stewart, Kolasch & Birch, LLP

(57) ABSTRACT

An internal air adjustment device supplies low-oxygen-concentration air to a storage, and maintains the oxygen concentration of internal air in a target oxygen concentration range that is lower than a reference concentration. The internal air adjustment device performs an oxygen-concentration restoration operation. The oxygen-concentration restoration operation is an operation of increasing the oxygen concentration of the internal air to the reference concentration from the target oxygen concentration range. In the oxygen-concentration restoration operation, a controller of the internal air adjustment device regulates the flow rate of external air that is supplied into the interior of the storage.

7 Claims, 6 Drawing Sheets

(58) Field of Classification Search
USPC .......................................... 99/467, 474, 476
See application file for complete search history.

(56) References Cited

U.S. PATENT DOCUMENTS

| | | | |
|---|---|---|---|
| 2005/0235658 A1* | 10/2005 | Fleming, Jr. | F24F 11/30 62/186 |
| 2008/0220133 A1* | 9/2008 | Carman | A23L 3/3445 99/467 |
| 2012/0097050 A1* | 4/2012 | Schaefer | A23B 7/144 99/468 |
| 2013/0340444 A1 | 12/2013 | Bryant et al. | |
| 2018/0194195 A1 | 7/2018 | Bryant et al. | |
| 2019/0141903 A1 | 5/2019 | Takayama et al. | |
| 2019/0216105 A1* | 7/2019 | Bessemans | A23B 7/148 |
| 2020/0229454 A1 | 7/2020 | Tagawa et al. | |
| 2020/0253226 A1 | 8/2020 | Kamei et al. | |
| 2020/0254384 A1 | 8/2020 | Kamei et al. | |
| 2020/0282356 A1 | 9/2020 | Kamei et al. | |
| 2021/0161075 A1 | 6/2021 | Takayama et al. | |
| 2021/0268431 A1 | 9/2021 | Kamei et al. | |
| 2021/0379963 A1 | 12/2021 | Bryant et al. | |

FOREIGN PATENT DOCUMENTS

| | | |
|---|---|---|
| JP | 2017-24615 A | 2/2017 |
| JP | 2017-190935 A | 10/2017 |
| WO | 2015/191878 A1 | 12/2015 |
| WO | WO2019/017485 A1 | 1/2019 |
| WO | 2019/085879 A1 | 4/2019 |
| WO | WO2019/065884 A1 | 4/2019 |

OTHER PUBLICATIONS

Extended European Search Report for European Application No. 20836751.6, dated Jun. 15, 2023.
International Search Report for PCT/JP2020/026842 mailed on Sep. 24, 2020.
Written Opinion of the International Searching Authority for PCT/JP2020/026842 mailed on Sep. 24, 2020.

* cited by examiner

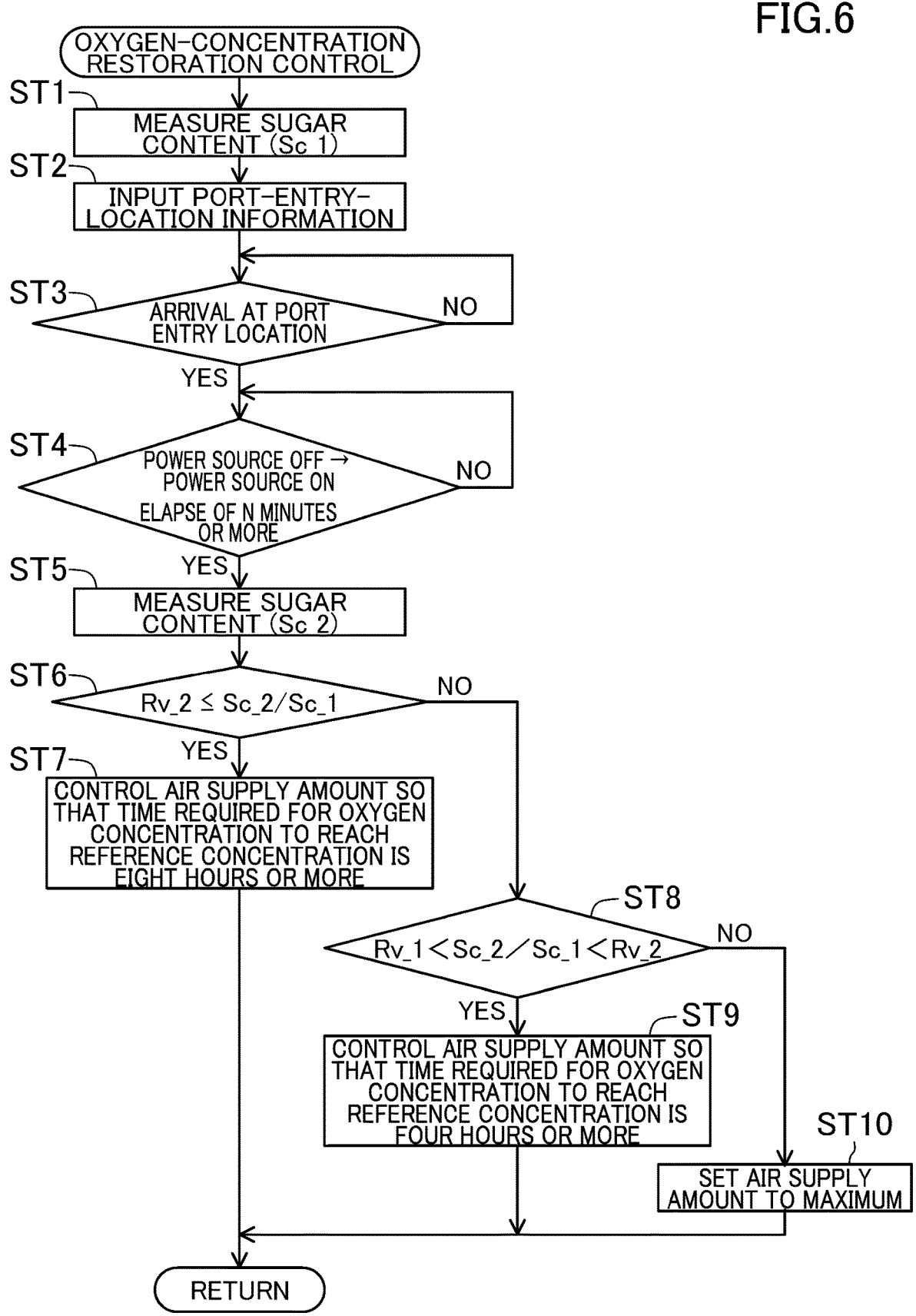

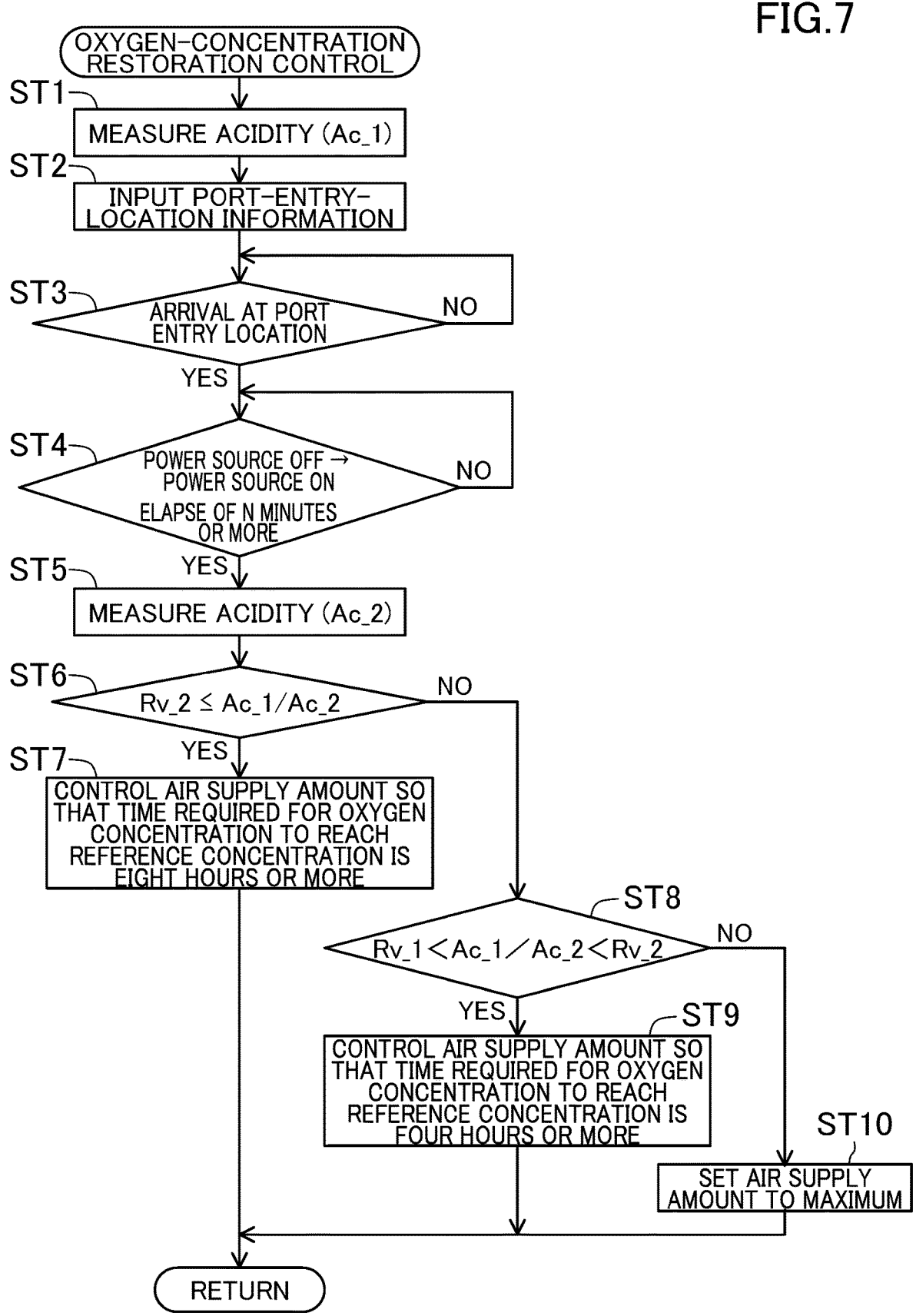

INTERNAL AIR ADJUSTMENT DEVICE

CROSS REFERENCE TO RELATED APPLICATIONS

This application is a Continuation of PCT International Application No. PCT/JP2020/026842, filed on Jul. 9, 2020, which claims priority under 35 U.S.C. 119(a) to Patent Application No. 2019-128406, filed in Japan on Jul. 10, 2019, all of which are hereby expressly incorporated by reference into the present application.

TECHNICAL FIELD

The present disclosure relates to an internal air adjustment device.

BACKGROUND ART

Hitherto, by controlling an internal environment (specifically, for example, the temperature of internal air or the composition of internal air) of a storage, the freshness of perishables stored in the storage has been maintained. For example, a refrigeration apparatus disclosed in Patent Literature 1 is used for a container that is used for, for example, transportation by sea, and controls the temperature and the composition (specifically, the oxygen concentration and the carbon dioxide concentration) of internal air of the container.

CITATION LIST

Patent Literature

PTL 1: Japanese Unexamined Patent Application Publication No. 2017-190935

SUMMARY

A first aspect of the present disclosure is directed to an internal air adjustment device (40) that supplies low-oxygen-concentration air having an oxygen concentration lower than an oxygen concentration of external air of a storage (1) to the storage (1), and that maintains an oxygen concentration of internal air of the storage (1) in a target oxygen concentration range lower than a reference concentration. The internal air adjustment device is constituted to perform an oxygen-concentration restoration operation of increasing the oxygen concentration of the internal air of the storage (1) to the reference concentration from the target oxygen concentration range, and includes a controller (50) that is configured to, in the oxygen-concentration restoration operation, regulate at least one of a flow rate and the oxygen concentration of the low-oxygen-concentration air that is supplied into an interior of the storage (1) or a flow rate of the external air that is supplied into the interior of the storage (1).

BRIEF DESCRIPTION OF DRAWINGS

FIG. 6 is a flow chart showing oxygen-concentration restoration control that is performed by a controller of the second embodiment.

FIG. 7 is a flow chart showing oxygen-concentration restoration control that is performed by a controller of a third embodiment.

DESCRIPTION OF EMBODIMENTS

First Embodiment

Figure 1:
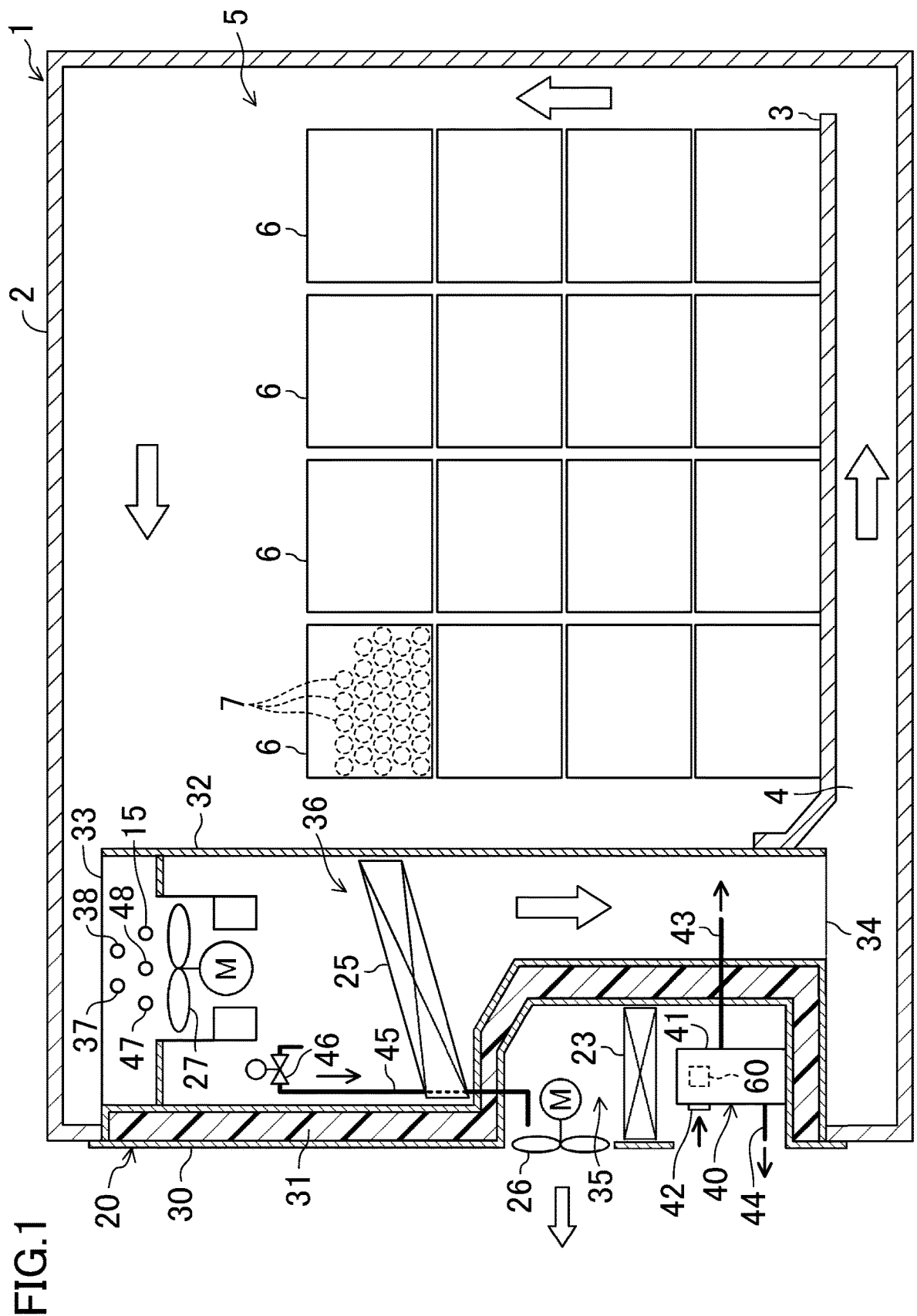
FIG. 1 is a schematic sectional view of a transport container provided with an internal air adjustment device of a first embodiment.

A first embodiment is described. An internal air adjustment device (40) of the present embodiment is installed in a container refrigeration apparatus (20). The internal air adjustment device (40) is provided, along with the container refrigeration apparatus (20), in a transport container (1) for performing a so-called CA (Controlled Atmosphere) transport.

The transport container (1) provided with the internal air adjustment device (40) of the present embodiment is used for transporting perishables (7). The transport container (1) constitutes a storage. The perishables (7) to be transported by the transport container (1) are primarily fresh produce, such as fruits and vegetables. In addition, the transport container (1) of the present embodiment is a container for ship transportation.

A container body (2) of the transport container (1) has a box shape that is an elongated rectangular parallelepiped shape. The container body (2) has one end that is open, and has the container refrigeration apparatus (20) mounted in the opening end to cover the opening end. An inside space of the container body (2) constitutes a load room (5) for storing cargoes (6). The cargoes (6) are those in which the perishables (7) are packed in boxes.

A floor plate (3) for placing the cargoes (6) thereon is disposed at a bottom portion of the load room (5). An underfloor flow path (4) for causing air blown out by the container refrigeration apparatus (20) to flow therein is formed between the floor plate (3) and a bottom plate of the container body (2). The underfloor flow path (4) is a flow path extending in a longitudinal direction of the container body (2) along the bottom plate of the container body (2). One end of the underfloor flow path (4) is connected to a blow-out port (34) of the container refrigeration apparatus (20), and the other end of the underfloor flow path (4) communicates with a space above the floor plate (3) (that is, a space in which the cargoes (6) are to be stored).

—Container Refrigeration Apparatus—

As shown in FIG. 1, the container refrigeration apparatus (20) includes a casing (30), a refrigerant circuit (21) that performs a refrigeration cycle, an external fan (26), and an internal fan (27).

The casing (30) includes a casing body (31) and a rear plate (32). The refrigerant circuit (21), the external fan (26), and the internal fan (27) are provided in the casing (30).

A lower portion of the casing body (31) has a shape that is recessed toward the load room (5) of the transport container (1). The lower portion of the casing body (31) forms an external machine room (35) that communicates with a space outside the transport container (1). The external fan (26) is disposed in the external machine room (35).

The rear plate (32) is a flat member having a substantially rectangular shape. The rear plate (32) is disposed closer to the load room (5) of the transport container (1) than the casing body (31) and forms an internal air flow path (36) between the rear plate (32) and the casing body (31).

An upper end of the internal air flow path (36) constitutes a suction port (33) of the casing (30), and a lower end of the internal air flow path (36) constitutes the blow-out port (34) of the casing (30). The internal air flow path (36) communicates with the load room (5) via the suction port (33), and communicates with the underfloor flow path (4) via the blow-out port (34). The internal fan (27) is disposed at an upper portion of the internal air flow path (36).

Figure 2:
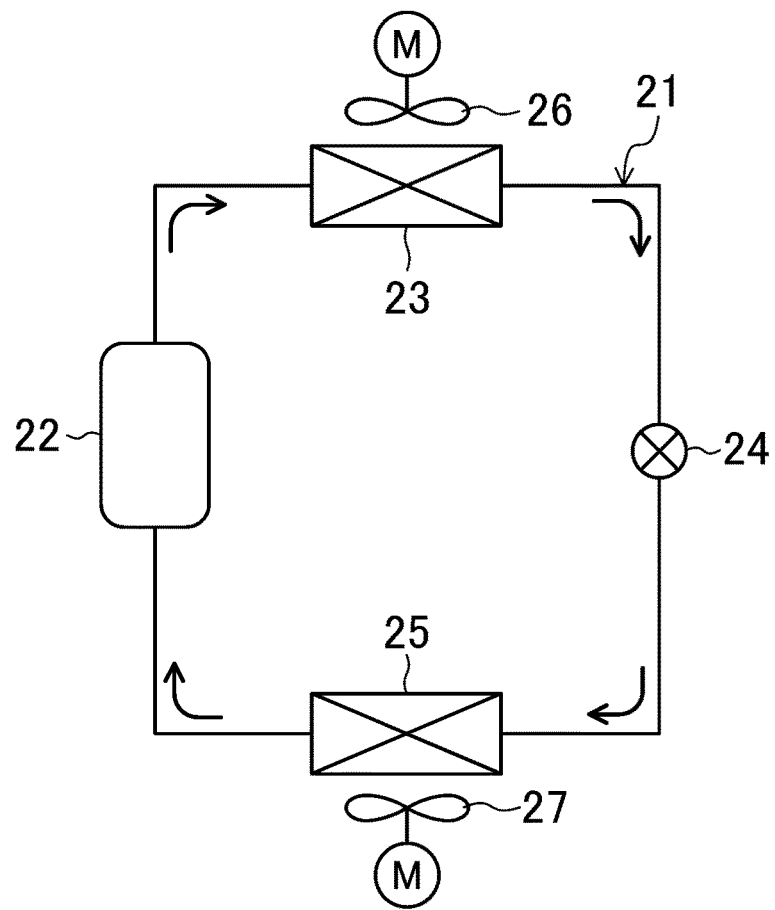
FIG. 2 illustrates a pipe system of a refrigerant circuit of a container refrigeration apparatus of the first embodiment.

As shown in FIG. 2, the refrigerant circuit (21) is a closed circuit formed by connecting a compressor (22), a condenser (23), an expansion valve (24), and an evaporator (25) by a pipe. When the compressor (22) operates, a refrigerant circulates in the refrigerant circuit (21), and a vapor compression refrigeration cycle is performed. As shown in FIG. 1, the condenser (23) is disposed on a suction side of the external fan (26) in the external machine room (35), and the evaporator (25) is disposed below the internal fan (27) in the internal air flow path (36). Although not shown in FIG. 1, the compressor (22) is disposed in the external machine room (35).

The container refrigeration apparatus (20) includes an internal temperature sensor (37) and an internal humidity sensor (38). The internal temperature sensor (37) and the internal humidity sensor (38) are disposed on an upstream side with respect to the evaporator (25) in the internal air flow path (36). The internal temperature sensor (37) measures the temperature of internal air sucked into the internal air flow path (36) from the suction port (33). The internal humidity sensor (38) measures the relative humidity of internal air sucked into the internal air flow path (36) from the suction port (33).

<Operations of Container Refrigeration Apparatus>

The container refrigeration apparatus (20) performs an operation of cooling internal air in the load room (5). In the refrigerant circuit (21) of the container refrigeration apparatus (20), a refrigerant circulates to perform a refrigeration cycle. Internal air sent to the internal air flow path (36) by the internal fan (27) is cooled by a refrigerant in the evaporator (25), and is supplied to the load room (5) via the blow-out port (34) and the underfloor flow path (4). In the condenser (23), a refrigerant dissipates heat with respect to external air that has flowed into the external machine room (35) due to the external fan (26).

—Internal Air Adjustment Device—

The internal air adjustment device (40) is a device that regulates the composition of air in the transport container (1). As shown in FIG. 1, the internal air adjustment device (40) includes a body unit (41), a ventilation discharge pipe (45), a GPS receiver (60), and a controller (50). The body unit (41) is installed in the external machine room (35) of the container refrigeration apparatus (20).

Although not shown, the body unit (41) of the internal air-conditioning device (40) accommodates two adsorption cylinders, a pressure pump that supplies compressed air to the adsorption cylinders, and a decompression pump that sucks air from the adsorption cylinders. By a so-called PSA (Pressure Swing Adsorption) method, the internal air adjustment device (40) produces corrected air whose composition differs from that of external air (that is, the atmosphere) serving as a raw material. The nitrogen concentration of the corrected air is higher than the nitrogen concentration of the external air, and the oxygen concentration of the corrected air is lower than the oxygen concentration of the external air. The corrected air is low-oxygen-concentration air.

<Body Unit>

The body unit (41) includes an outside-air suction port (42) for taking in external air into the body unit (41). A supply pipe (43) and an oxygen discharge pipe (44) are connected to the body unit (41). The supply pipe (43) is a pipe for introducing corrected air produced in the body unit (41) to the load room (5), and its terminal end opens into the internal air flow path (36). The oxygen discharge pipe (44) is a pipe for discharging to the outside high-oxygen-concentration air produced in the body unit (41), and its terminal end opens into the external machine room (35).

<Ventilation Discharge Pipe>

The ventilation discharge pipe (45) is a pipe for discharging internal air of the transport container (1) to the outside. One end of the ventilation discharge pipe (45) opens into the internal air flow path (36) and the other end of the ventilation discharge pipe (45) opens into the external machine room (35). A ventilation discharge valve (46) is provided at the ventilation discharge pipe (45). The ventilation discharge valve (46) is an on-off valve constituted by an electromagnetic valve.

<Sensors>

The internal air adjustment device (40) includes an oxygen concentration sensor (47) and a carbon dioxide concentration sensor (48). The oxygen concentration sensor (47) and the carbon dioxide concentration sensor (48) are disposed on the upstream side with respect to the evaporator (25) in the internal air flow path (36). The oxygen concentration sensor (47) measures the oxygen concentration of internal air sucked into the internal air flow path (36) from the suction port (33). The carbon dioxide concentration sensor (48) measures the concentration of carbon dioxide of the internal air sucked into the internal air flow path (36) from the suction port (33).

The internal air adjustment device (40) includes a state indicator sensor (15). The state indicator sensor (15) is a state detector. The state indicator sensor (15) is a sensor that measures a state indicator, which is a physical quantity indicating the freshness of perishables (7). The state indicator sensor (15) of the present embodiment measures the ethylene concentration of internal air as a state indicator.

<GPS Receiver>

The internal air adjustment device (40) includes the GPS receiver (60). The GPS receiver (60) is provided at the body unit (41). The GPS receiver (60) receives an output signal of a GPS (Global Positioning System) satellite, and calculates the position of the GPS receiver (60) based on the received output signal. The GPS receiver (60) is a position detector that detects the position of the transport container (1).

<Controller>

Figure 3:
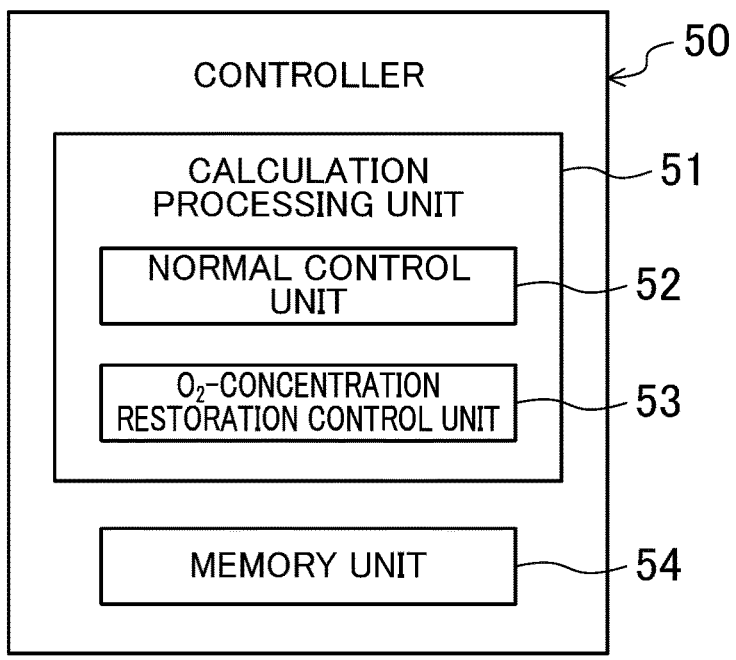
FIG. 3 is a block diagram showing a structure of a controller of the internal air adjustment device of the first embodiment.

As shown in FIG. 3, the controller (50) controls the operation of the internal air-conditioning device (40). The controller (50) includes a calculation processing unit (51) and a memory unit (54).

The calculation processing unit (51) is, for example, a microprocessor constituted by an integrated circuit. The calculation processing unit (51) executes a predetermined program to function as a normal control unit (52) and an oxygen-concentration restoration control unit (53).

The memory unit (54) is, for example, a semiconductor memory constituted by an integrated circuit. The memory unit (54) stores a program for causing the controller (50) to execute a predetermined operation, and data required for the operation of the controller (50).

—Operations of Internal Air Adjustment Device—

The internal air adjustment device (40) is capable of executing a normal operation and an oxygen-concentration restoration operation.

The normal operation is an operation of reducing the oxygen concentration of internal air to a target range (for example, 5%±1%) and maintaining the oxygen concentration of the internal air in the target range. In the normal operation, the internal air adjustment device (40) intermittently supplies corrected air (air produced in the body unit (41) and having an oxygen concentration lower than that of the atmosphere) to the load room (5) to maintain the oxygen concentration of the internal air in the target range.

The oxygen-concentration restoration operation is an operation of increasing the oxygen concentration of internal air to a reference concentration (for example, 21%, which is the same as the oxygen concentration of the atmosphere) from the target range. The reference concentration is ordinarily set to a value that is greater than or equal to 16% and less than or equal to 21%. The oxygen-concentration restoration operation is performed for allowing a person to enter the load room (5). In the oxygen-concentration restoration operation, the internal air adjustment device (40) supplies external air (atmosphere) to the load room (5) to increase the oxygen concentration of internal air to the reference concentration. During this time, the internal air adjustment device (40) regulates the flow rate of the external air that is supplied to the load room (5) to control the speed of increase in the oxygen concentration of the internal air.

—Operations of Normal Control Unit of Controller—

The normal control unit (52) controls structural devices of the internal air adjustment device (40) during a normal operation.

<Pull-Down Operation>

When the normal operation is started, the normal control unit (52) performs a pull-down operation for reducing the oxygen concentration of internal air to the target range (for example, 5%±1%) from 21% (the oxygen concentration of the atmosphere).

In the pull-down operation, the normal control unit (52) operates the body unit (41) and opens the ventilation discharge valve (46). The body unit (41) supplies corrected air that it has produced to the load room (5). Air in the load room (5) is discharged to the outside of the transport container (1) via the ventilation discharge pipe (45). As a result, the air in the load room (5) is replaced by the corrected air having an oxygen concentration that is lower than that of the atmosphere, and the oxygen concentration of internal air is reduced. When a measured value of the oxygen concentration sensor (47) reaches a maximum value (for example, 5%+1%) of the target range, the normal control unit (52) stops the body unit (41) and closes the ventilation discharge valve (46).

<Concentration Maintaining Operation>

The normal control unit (52) also performs a concentration maintaining operation for maintaining the oxygen concentration of internal air in the target range (for example, 5%±1%).

Since the perishables (7) stored in the load room (5) breathe, the oxygen concentration of the internal air gradually decreases while the body unit (41) is stopped. When a measured value of the oxygen concentration sensor (47) reaches a minimum value (for example, 5%−1%) of the target range while the body unit (41) is stopped, the normal control unit (52) operates the body unit (41) and opens the ventilation discharge valve (46). The body unit (41) supplies corrected air having an oxygen concentration that is higher than the maximum value of the target range, or external air (atmosphere) to the load room (5). As a result, the oxygen concentration of the internal air is increased. When a measured value of the oxygen concentration sensor (47) reaches the maximum value (for example, 5%+1%) of the target range, the normal control unit (52) stops the body unit (41) and closes the ventilation discharge valve (46). In the concentration maintaining operation, the normal control unit (52) repeats these operations.

—Operations of Oxygen-Concentration Restoration Control Unit of Controller—

The oxygen-concentration restoration control unit (53) determines whether to cause the internal air adjustment device (40) to start an oxygen-concentration restoration operation, and controls the structural devices of the internal air adjustment device (40) during the oxygen-concentration restoration operation. Here, operations that are performed by the oxygen-concentration restoration control unit (53) are described with reference to the flowchart of FIG. 4.

<Step ST1>

After perishables (7) have been brought into the load room (5), when the normal control unit (52) starts a pull-down operation, the oxygen-concentration restoration control unit (53) performs the operation of Step ST1. In the operation of Step ST1, the oxygen-concentration restoration control unit (53) reads a measured value (in the present embodiment, a measured value of the ethylene concentration of internal air) of the state indicator sensor (15). The oxygen-concentration restoration control unit (53) causes the memory unit (54) to store the measured value of the state indicator sensor (15) that has been read as an initial ethylene concentration (Et_1).

<Step ST2>

Next, the oxygen-concentration restoration control unit (53) performs the operation of Step ST2. In the operation of Step ST2, the oxygen-concentration restoration control unit (53) obtains port-entry-location information. The port-entry-location information is information (for example, the latitude and longitude) indicating the position of a port, which is the destination of the transport container (1). The oxygen-concentration restoration control unit (53) obtains the port-entry-location information that has been input by a worker to, for example, an operation panel of the container refrigeration apparatus (20), and causes the memory unit (54) to store the obtained port-entry-location information.

<Step ST3>

Next, the oxygen-concentration restoration control unit (53) performs the operation of Step ST3. In the operation of Step ST3, the oxygen-concentration restoration control unit (53) compares position information obtained from the GPS receiver (60) with the port-entry-location information obtained in Step ST2. The position information obtained from the GPS receiver (60) is information (for example, the latitude and longitude) indicating the current position of the transport container (1).

When the position information obtained from the GPS receiver (60) is not the same as the port-entry-location information, the oxygen-concentration restoration control unit (53) continues comparing the position information obtained from the GPS receiver (60) and the port-entry-location information with each other. On the other hand, when the position information obtained from the GPS receiver (60) is substantially the same as the port-entry-location information, it can be determined that the transport container (1) has reached the destination. In this case, the oxygen-concentration restoration control unit (53) performs the operation of Step ST4.

<Step ST4>

Here, the transport container (1) that is being transported is connected to a power source, and electric power is supplied to the container refrigeration apparatus (20) and the internal air adjustment device (40). When the transport container (1) is to be moved onto land from a ship, the transport container (1) is temporarily disconnected from the power source. In this state, the supply of electric power to the container refrigeration apparatus (20) and the internal air adjustment device (40) is stopped. The transport container (1) in a disconnected state from the power source is brought down from the ship by a crane, and then is transported to a container depot at the port. At the container depot, the transport container (1) is connected to the power source again, and electric power is supplied again to the container refrigeration apparatus (20) and the internal air adjustment device (40).

In this way, in the process in which the transport container (1) reaches the destination and is transported to the container depot from the ship, the supply of electric power to the internal air adjustment device (40) is temporarily stopped and, then, after the elapse of a certain period of time, the supply of electric power to the internal air adjustment device (40) is started again. At the container depot, for, for example, quarantine inspection, a person needs to enter the load room (5) of the transport container (1). Therefore, the oxygen-concentration restoration control unit (53) of the present embodiment defines, as at least one condition for causing the internal air adjustment device (40) to start the oxygen-concentration restoration operation, the condition regarding an elapse time from when the supply of electric power to the internal air adjustment device (40) has been stopped to when the supply of electric power to the internal air adjustment device (40) is started again.

In the operation of Step ST4, the oxygen-concentration restoration control unit (53) determines whether the condition that "the elapse time from when the supply of electric power to the internal air adjustment device (40) has been stopped to when the supply of electric power to the internal air adjustment device (40) is started again is greater than or equal to N minutes (for example, 30 minutes)" is satisfied. When the condition is not satisfied, the oxygen-concentration restoration control unit (53) continues monitoring the elapse time from when the supply of electric power to the internal air adjustment device (40) has been stopped to when the supply of electric power to the internal air adjustment device (40) is started again. On the other hand, when the condition is satisfied, the oxygen-concentration restoration control unit (53) performs the operation of the following Step ST5.

<Step ST5>

In the operation of Step ST5, the oxygen-concentration restoration control unit (53) reads a measured value (in the present embodiment, a measured value of the ethylene concentration of the internal air) of the state indicator sensor (15). The oxygen-concentration restoration control unit (53) causes the memory unit (54) to store the measured value of the state indicator sensor (15) that has been read as a current ethylene concentration ($Et\_2$).

<Step ST6>

Next, the oxygen-concentration restoration control unit (53) performs the operation of Step ST6. In the operation of Step ST6, the oxygen-concentration restoration control unit (53) compares a value ($Et\_2/Et\_1$) obtained by dividing the current ethylene concentration ($Et\_2$) by the initial ethylene concentration ($Et\_1$) with a predetermined upper reference value ($Rv\_2$).

The perishables (7) discharge ethylene as the freshness thereof is reduced. Therefore, it is possible to infer that, the larger the amount of increase in the concentration of ethylene of the internal air is, the lower the freshness of the perishables (7) is. That is, it is possible to infer that, the larger the value of $Et\_2/Et\_1$ is, the larger the degree of reduction in the freshness.

Therefore, when $Et\_2/Et\_1$ is greater than or equal to the upper reference value ($Rv\_2$), that is, $Rv\_2 \leq Et\_2/Et\_1$, the oxygen-concentration restoration control unit (53) performs the operation of Step ST7. On the other hand, when $Et\_2/Et\_1$ is less than the upper reference value ($Rv\_2$), that is, $Et\_2/Et\_1 < Rv\_2$, the oxygen-concentration restoration control unit (53) performs the operation of Step ST8.

<Step ST7>

In the operation of Step ST7, the oxygen-concentration restoration control unit (53) causes the internal air adjustment device (40) to execute the oxygen-concentration restoration operation. Specifically, the oxygen-concentration restoration control unit (53) operates the pumps, provided at the body unit (41) of the internal air adjustment device (40), to supply external air to the load room (5), and opens the ventilation discharge valve (46) to discharge the internal air to the outside of the transport container (1). As a result, the air in the load room (5) is gradually replaced by the external air (atmosphere), and the oxygen concentration of internal air is increased.

The oxygen-concentration restoration control unit (53) continues supplying external air to the load room (5) until a measured value of the oxygen concentration sensor (47) reaches the predetermined reference concentration. The reference concentration is an oxygen concentration that is set so as not to adversely affect a person, and is set to a value greater than or equal to 16%. It is desirable that the reference concentration be set in a range greater than or equal to 18% and less than or equal to 21%.

In the operation of Step ST7, the oxygen-concentration restoration control unit (53) regulates the flow rate of the external air that is supplied to the load room (5) so that the speed of increase in the oxygen concentration of the internal air is less than or equal to a predetermined maximum speed. In the operation of Step ST7, the maximum speed is set to a value in which the time required for the oxygen concentration to become the reference concentration is greater than or equal to 8 hours. For example, when the current oxygen concentration of the internal air is 5% and the reference concentration is 21%, the maximum speed is set to a value less than or equal to 2% per hour.

The oxygen-concentration restoration control unit (53) calculates the speed of increase in the oxygen concentration of the internal air based on temporal change in the measured value of the oxygen concentration sensor (47), and regulates the flow rate of the external air that is supplied to the load room (5) so that the calculated speed of increase in the oxygen concentration is less than or equal to the maximum speed. When the calculated speed of increase in the oxygen concentration exceeds the maximum speed, the oxygen-concentration restoration control unit (53) reduces the flow rate of the external air that is supplied to the load room (5). When the calculated speed of increase in the oxygen concentration is less than the maximum speed, the oxygen-concentration restoration control unit (53) increases the flow rate of the external air that is supplied to the load room (5).

When $Et\_2/Et\_1$ is greater than or equal to the upper reference value ($Rv\_2$), it can be inferred that the amount of increase in the ethylene concentration of the internal air during the transport is relatively large, and the freshness of the perishables (7) is low. Therefore, in this case, the oxygen-concentration restoration control unit (53) sets the maximum speed to a relatively low value, and keeps low the speed of increase in the oxygen concentration of the internal air during the oxygen-concentration restoration operation. As a result, it is possible to keep low a reduction in the freshness of the perishables (7) during the oxygen-concentration restoration operation.

<Step ST8>

In the operation of Step ST8, the oxygen-concentration restoration control unit (53) compares the value (Et_2/Et_1) obtained by dividing the current ethylene concentration (Et_2) by the initial ethylene concentration (Et_1) with a predetermined lower reference value (Rv_1) and the predetermined upper reference value (Rv_2).

Therefore, as in the description about Step ST6, it is possible to infer that, the larger the amount of increase in the ethylene concentration of the internal air is, the lower the freshness of the perishables (7) is. That is, it is possible to infer that, the smaller the value of Et_2/Et_1 is, the smaller the degree of reduction in the freshness is.

Therefore, when Et_2/Et_1 is greater than the lower reference value (Rv_1) and less than the upper reference value (Rv_2), that is, Rv_1<Et_2/Et_1<Rv_2, the oxygen-concentration restoration control unit (53) performs the operation of Step ST9. On the other hand, when Et_2/Et_1 is less than or equal to the lower reference value (Rv_1), that is, Et_2/Et_1≤Rv_1, the oxygen-concentration restoration control unit (53) performs the operation of Step ST10.

<Step ST9>

In the operation of Step ST9, the oxygen-concentration restoration control unit (53) causes the internal air adjustment device (40) to execute the oxygen-concentration restoration operation. Similarly to the operation of Step ST7, the oxygen-concentration restoration control unit (53) supplies external air to the load room (5) via the supply pipe (43), and discharges the internal air to the outside of the transport container (1) via the ventilation discharge pipe (45). Similarly to the operation of Step ST7, the oxygen-concentration restoration control unit (53) continues supplying external air to the load room (5) until the measured value of the oxygen concentration sensor (47) reaches the predetermined reference concentration.

In the operation of Step ST9, the oxygen-concentration restoration control unit (53) regulates the flow rate of the external air that is supplied to the load room (5) so that the speed of increase in the oxygen concentration of the internal air is less than or equal to the predetermined maximum speed. In the operation of Step ST9, the maximum speed is set to a value in which the time required for the oxygen concentration to become the reference concentration is greater than or equal to 4 hours. For example, when the current oxygen concentration of the internal air is 5% and the reference concentration is 21%, the maximum speed is set to a value less than or equal to 4% per hour.

Similarly to the operation of Step ST7, the oxygen-concentration restoration control unit (53) calculates the speed of increase in the oxygen concentration of the internal air based on temporal change in the measured value of the oxygen concentration sensor (47), and regulates the flow rate of the external air that is supplied to the load room (5) so that the calculated speed of increase in the oxygen concentration is less than or equal to the maximum speed.

When Et_2/Et_1 is greater than the lower reference value (Rv_1) and less than the upper reference value (Rv_2), it can be inferred that the amount of increase in the ethylene concentration of the internal air during the transport is a moderate amount, and the freshness of the perishables (7) is not so low. Therefore, in this case, the oxygen-concentration restoration control unit (53) sets the maximum speed to a moderate value, and keeps moderate the speed of increase in the oxygen concentration of the internal air during the oxygen-concentration restoration operation. As a result, the time up to when the oxygen concentration of the internal air reaches the reference concentration can be reduced to the extent possible without reducing the freshness of the perishables (7) so much during the oxygen-concentration restoration operation.

<Step ST10>

In the operation of Step ST10, the oxygen-concentration restoration control unit (53) causes the internal air adjustment device (40) to execute the oxygen-concentration restoration operation. Similarly to the operation of Step ST7, the oxygen-concentration restoration control unit (53) supplies external air to the load room (5) via the supply pipe (43), and discharges the internal air to the outside of the transport container (1) via the ventilation discharge pipe (45).

In the operation of Step ST10, the oxygen-concentration restoration control unit (53) maintains at a maximum flow rate the flow rate of the external air that is supplied to the load room (5). Similarly to the operation of Step ST7, the oxygen-concentration restoration control unit (53) continues supplying external air to the load room (5) until the measured value of the oxygen concentration sensor (47) reaches the predetermined reference concentration.

When Et_2/Et_1 is less than or equal to the lower reference value (Rv_1), it can be inferred that the ethylene concentration of the internal air during the transport has increased very little, and the freshness of the perishables (7) is maintained. Therefore, in this case, the oxygen-concentration restoration control unit (53) maintains at the maximum flow rate the flow rate of the external air that is supplied to the load room (5). As a result, it is possible to reduce the time up to when the oxygen concentration of the internal air reaches the reference concentration.

—Characteristic (1) of First Embodiment—

The internal air adjustment device (40) of the present embodiment supplies low-oxygen-concentration air having an oxygen concentration that is lower than that of external air to the transport container (1), and maintains the oxygen concentration of internal air of the transport container (1) in the target oxygen concentration range that is lower than the reference concentration. The internal air adjustment device (40) is constituted to perform an oxygen-concentration restoration operation. The oxygen-concentration restoration operation is an operation of increasing the oxygen concentration of internal air of the transport container (1) to the reference concentration from the target oxygen concentration range. The internal air adjustment device (40) of the present embodiment includes the controller (50). In the oxygen-concentration restoration operation, the controller (50) regulates the flow rate of external air that is supplied into the interior of the transport container (1).

In the oxygen-concentration restoration operation, the internal air adjustment device (40) performs a predetermined operation for increasing to the reference concentration the oxygen concentration of the internal air maintained in the target oxygen concentration range that is lower than the reference concentration. In the oxygen-concentration restoration operation, the controller (50) of the internal air adjustment device (40) regulates the flow rate of external air that is supplied into the interior of the transport container (1). Therefore, according to the present embodiment, it is possible to control the speed of increase in the oxygen concentration of the internal air during the oxygen-concentration restoration operation of the internal air adjustment device (40), and to suppress a reduction in the freshness of the perishables (7) during the oxygen-concentration restoration operation.

—Characteristic (2) of First Embodiment—

The controller (50) of the present embodiment regulates the flow rate of external air that is supplied into the interior of the transport container (1) so that the speed of increase in the oxygen concentration of internal air is less than or equal to the predetermined maximum speed. When the speed of increase in the oxygen concentration of internal air is made less than or equal to the maximum speed, it is possible to suppress a sudden change in the metabolic rate of stored products and to suppress a reduction in the freshness of the stored products.

—Characteristic (3) of First Embodiment—

The internal air adjustment device (40) of the present embodiment includes the GPS receiver (60) that detects the position of the transport container (1). The controller (50) of the present embodiment determines whether to start of an oxygen-concentration restoration operation by using the position of the transport container (1) detected by the GPS receiver (60) during the transport of the transport container (1).

The controller (50) of the present embodiment determines whether to start of an oxygen-concentration restoration operation by using the position of the transport container (1) detected by the GPS receiver (60). The controller (50) is capable of determining that the transport container (1) has reached its destination based on the position of the transport container (1) detected by the GPS receiver (60). Therefore, when the transport container (1) has reached its destination and the probability of a person entering the transport container (1) anytime soon is high, it is possible to start the oxygen-concentration restoration operation. Thus, according to the aspect, the oxygen-concentration restoration operation of the internal air adjustment device (40) can be started at a proper timing.

—Characteristic (4) of First Embodiment—

The controller (50) of the present embodiment defines, as at least one condition for starting an oxygen-concentration restoration operation, the condition regarding the time from when the supply of electric power to the internal air adjustment device (40) has been stopped to when the supply of electric power to the internal air adjustment device (40) is started again.

Here, when the transport container (1) of the present embodiment is to be moved onto land from a ship, the transport container (1) is moved with the supply of electric power to the internal air adjustment device (40) being stopped, and, after placing the transport container (1) on a predetermined location, the supply of electric power to the internal air adjustment device (40) is started again. Therefore, if the time that has elapsed from when the supply of electric power to the internal air adjustment device (40) has been stopped to when the supply of electric power to the internal air adjustment device (40) is started again is monitored, it is possible to infer whether a person will enter the storage (1) anytime soon for, for example, performing work.

Therefore, the controller (50) of the present embodiment defines, as at least one condition for starting an oxygen-concentration restoration operation, the condition regarding the time from when the supply of electric power to the internal air adjustment device (40) has been stopped to when the supply of electric power to the internal air adjustment device (40) is started again. Consequently, according to the present embodiment, when the probability of a person entering the transport container (1) anytime soon is high, it is possible to start the oxygen-concentration restoration operation. Therefore, according to the present embodiment, the oxygen-concentration restoration operation of the internal air adjustment device (40) can be started at a proper timing.

—Characteristic (5) of First Embodiment—

The internal air adjustment device (40) of the present embodiment includes the state indicator sensor (15). The state indicator sensor (15) detects a state indicator that indicates the state of the perishables (7) stored in the transport container (1). The controller (50) regulates the speed of increase in the oxygen concentration of internal air in the oxygen-concentration restoration operation based on the state indicator detected by the state indicator sensor (15).

The controller (50) of the present embodiment regulates the speed of increase in the oxygen concentration of internal air in the oxygen-concentration restoration operation based on a state indicator that indicates the state of the perishables (7) stored in the transport container (1). Therefore, according to the present embodiment, it is possible to suppress a reduction in the freshness of stored products caused by an increase in the oxygen concentration of the internal air during the oxygen-concentration restoration operation of the internal air adjustment device (40).

—Characteristic (6) of First Embodiment—

The internal air adjustment device (40) of the present embodiment is constituted to perform an oxygen-concentration restoration operation before the door of the transport container (1) is opened.

Therefore, according to the present embodiment, before the door of the transport container (1) is opened for allowing a person to enter the transport container (1), it is possible to increase the oxygen concentration of internal air to the reference concentration by the internal air adjustment device (40) performing the oxygen-concentration restoration operation.

Second Embodiment

A second embodiment is described. An internal air adjustment device (40) of the present embodiment differs from the internal air adjustment device (40) of the first embodiment in state indicator sensors (15) and an oxygen-concentration restoration control unit (53) of a controller (50). Here, the differences of the internal air adjustment device (40) of the present embodiment from the internal air adjustment device (40) of the first embodiment are described.

—State Indicator Sensors—

Each state indicator sensor (15) of the present embodiment measures the sugar content of perishables (7) as a state indicator. As each state indicator sensor (15), a near-infrared spectrometer that irradiates an object with near-infrared rays and that measures the sugar content of the object based on the wavelength of the near-infrared rays that are absorbed by the object can be used.

Figure 5:
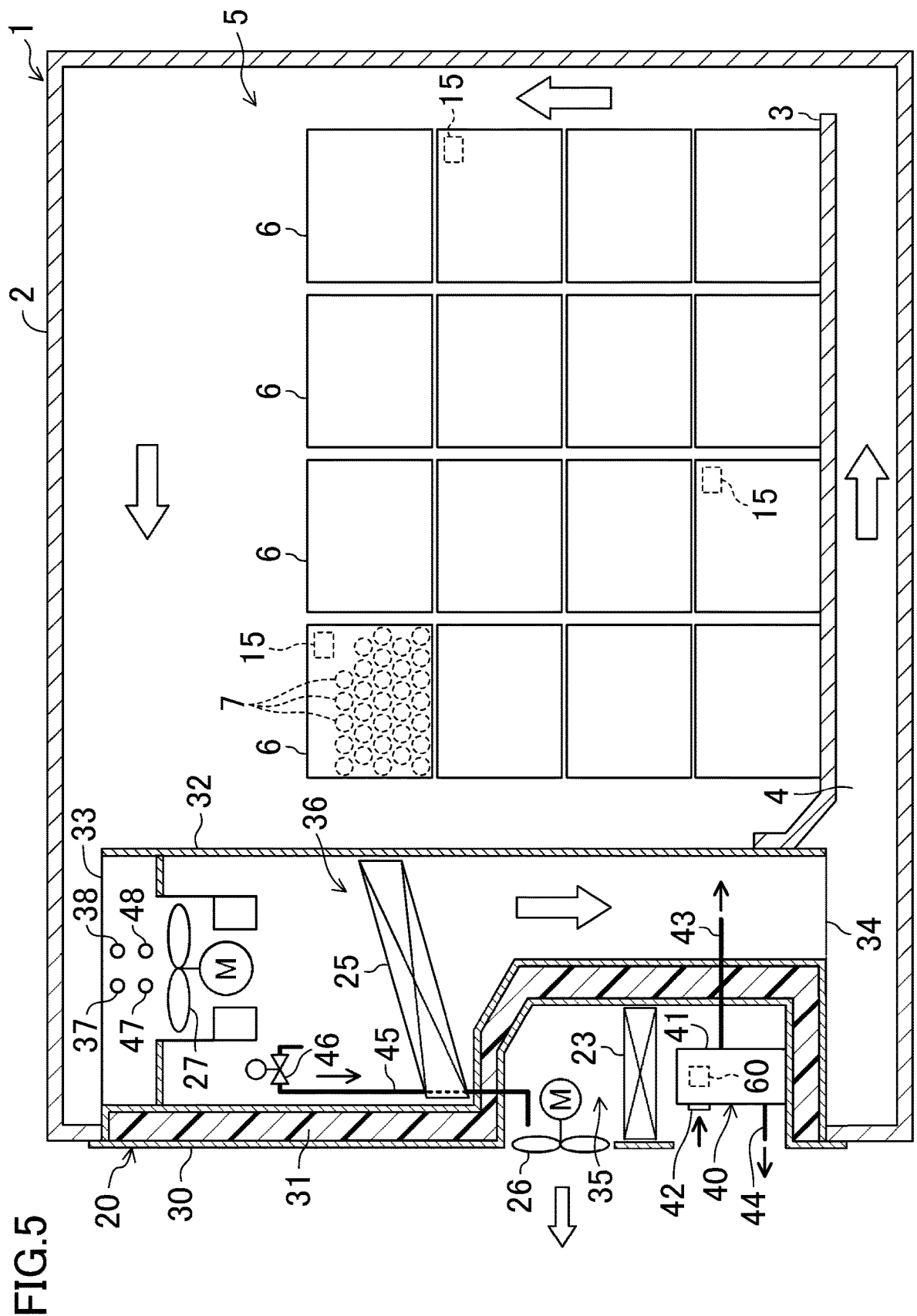
FIG. 5 is a schematic sectional view of a transport container provided with an internal air adjustment device of a second embodiment.

As shown in FIG. 5, the internal air adjustment device (40) of the present embodiment includes a plurality of (in the present embodiment, three) state indicator sensors (15). The state indicator sensors (15) are each provided for a plurality of (in the present embodiment, three) cargoes (6) disposed at different positions.

—Oxygen-Concentration Restoration Control Unit of Controller—

The oxygen-concentration restoration control unit (53) of the controller (50) of the present embodiment is constituted to regulate the speed of increase in the oxygen concentration of internal air based on the sugar content of perishables (7).

Figure 4:
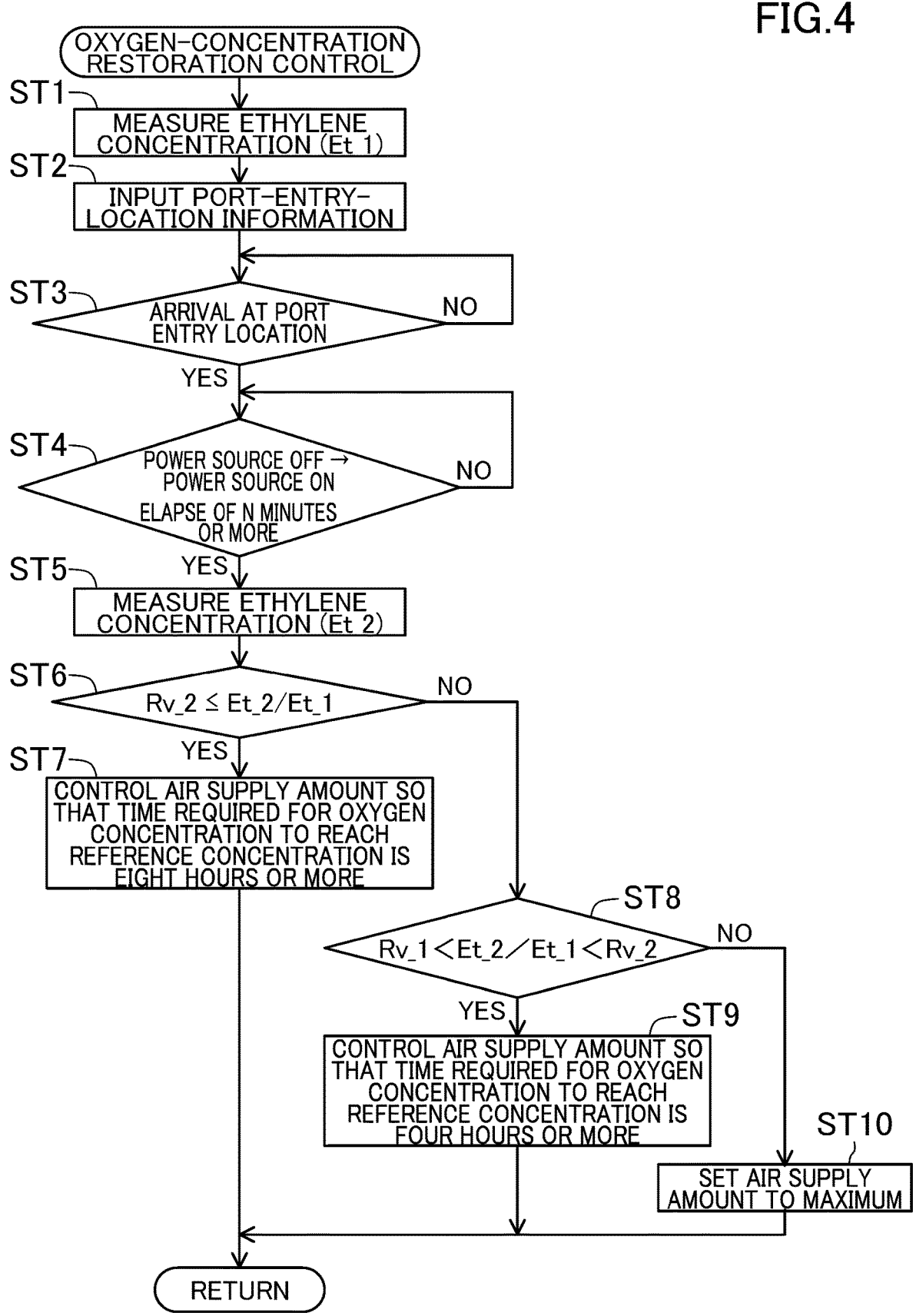
FIG. 4 is a flow chart showing oxygen-concentration restoration control that is performed by the controller of the first embodiment.

Operations of the oxygen-concentration restoration control unit (53) of the present embodiment are described with reference to the flowchart of FIG. 6. The operations shown in FIG. 6 are such that Step ST1, Step ST5, Step ST6, and Step ST8 differ from those shown in the flowchart of FIG. 4. Here, regarding the operations that are performed by the oxygen-concentration restoration control unit (53) of the present embodiment, differences from those shown in the flowchart of FIG. 4 are described.

<Step ST1>

In the operation of Step ST1, the oxygen-concentration restoration control unit (53) reads measured values (in the present modification, measured values of the sugar contents of the perishables (7)) of the state indicator sensors (15). The oxygen-concentration restoration control unit (53) of the present embodiment reads the measured values of the three state indicator sensors (15), and causes a memory unit (54) to store the arithmetic mean of the three measured values that have been read as initial sugar contents (Sc_1).

<Step ST5>

In the operation of Step ST5, the oxygen-concentration restoration control unit (53) reads measured values (in the present embodiment, measured values of the sugar contents of the perishables (7)) of the state indicator sensors (15). The oxygen-concentration restoration control unit (53) of the present embodiment reads the measured values of the three state indicator sensors (15), and causes the memory unit (54) to store the arithmetic mean of the three measured values that have been read as current sugar contents (Sc_2).

<Step ST6>

In the operation of Step ST6, the oxygen-concentration restoration control unit (53) compares values (Sc_2/Sc_1) obtained by dividing the current sugar contents (Sc_2) by the corresponding initial sugar contents (Sc_1) with a predetermined upper reference value (Rv_2).

The sugar content of perishables (7), such as fruits, increases as the freshness is reduced. Therefore, it is possible to infer that, the larger the amount of increase in the sugar content of the perishables (7) is, the lower the freshness of the perishables (7) is. That is, it is possible to infer that, the larger the value of Sc_2/Sc_1 is, the larger the degree of reduction in the freshness.

Therefore, when Sc_2/Sc_1 is greater than or equal to the upper reference value (Rv_2), that is, Rv_2≤Sc_2/Sc_1, the oxygen-concentration restoration control unit (53) performs the operation of Step ST7. On the other hand, when Sc_2/Sc_1 is less than the upper reference value (Rv_2), that is, (Sc_2/Sc_1<Rv_2), the oxygen-concentration restoration control unit (53) performs the operation of Step ST8. Note that the upper reference value (Rv_2) of the present embodiment differs from the upper reference value (Rv_2) of the first embodiment.

<Step ST8>

In the operation of Step ST8, the oxygen-concentration restoration control unit (53) compares the values (Sc_2/Sc_1) obtained by dividing the current sugar contents (Sc_2) by the corresponding initial sugar contents (Sc_1) with a predetermined lower reference value (Rv_1) and the predetermined upper reference value (Rv_2).

Therefore, as in the description about Step ST6, it is possible to infer that, the larger the amount of increase in the sugar content of the perishables (7) is, the lower the freshness of the perishables (7) is. That is, it is possible to infer that, the smaller the value of Sc_2/Sc_1 is, the smaller the degree of reduction in the freshness.

Therefore, when Sc_2/Sc_1 is greater than the lower reference value (Rv_1) and less than the upper reference value (Rv_2), that is, Rv_1<Sc_2/Sc_1<Rv_2, the oxygen-concentration restoration control unit (53) performs the operation of Step ST9. On the other hand, when Sc_2/Sc_1 is less than or equal to the lower reference value (Rv_1), that is, Sc_2/Sc_1≤Rv_1, the oxygen-concentration restoration control unit (53) performs the operation of Step ST10. Note that the lower reference value (Rv_1) of the present embodiment differs from the lower reference value (Rv_1) of the first embodiment.

Third Embodiment

A third embodiment is described. An internal air adjustment device (40) of the present embodiment differs from the internal air adjustment device (40) of the second embodiment in state indicator sensors (15) and an oxygen-concentration restoration control unit (53) of a controller (50). Here, the differences of the internal air adjustment device (40) of the present embodiment from the internal air adjustment device (40) of the second embodiment are described.

—State Indicator Sensors—

Each state indicator sensor (15) of the present embodiment measures the acidity of perishables (7) as a state indicator. As each state indicator sensor (15), a near-infrared spectrometer that irradiates an object with near-infrared rays and that measures the acidity of the object based on the wavelength of the near-infrared rays that are absorbed by the object can be used. Similarly to the second embodiment, the state indicator sensors (15) of the present embodiment are each provided for a plurality of (in the present embodiment, three) cargoes (6) disposed at different positions.

—Oxygen-Concentration Restoration Control Unit of Controller—

The oxygen-concentration restoration control unit (53) of the controller (50) of the present embodiment is constituted to regulate the speed of increase in the oxygen concentration of internal air based on the acidity of the perishables (7).

Operations of the oxygen-concentration restoration control unit (53) of the present embodiment are described with reference to the flowchart of FIG. 7. The operations shown in FIG. 7 are such that Step ST1, Step ST5, Step ST6, and Step ST8 differ from those shown in the flowchart of FIG. 6. Here, regarding the operations that are performed by the oxygen-concentration restoration control unit (53) of the present embodiment, differences from those shown in the flowchart of FIG. 6 are described.

<Step ST1>

In the operation of Step ST1, the oxygen-concentration restoration control unit (53) reads measured values (in the present embodiment, measured values of the acidities of the perishables (7)) of the state indicator sensors (15). The oxygen-concentration restoration control unit (53) of the present embodiment reads the measured values of the three state indicator sensors (15), and causes a memory unit (54) to store the arithmetic mean of the three measured values that have been read as initial acidities (Ac_1).

<Step ST5>

In the operation of Step ST5, the oxygen-concentration restoration control unit (53) reads measured values (in the present embodiment, measured values of the acidities of the perishables (7)) of the state indicator sensors (15). The oxygen-concentration restoration control unit (53) of the present embodiment reads the measured values of the three state indicator sensors (15), and causes the memory unit (54) to store the arithmetic mean of the three measured values that have been read as current acidities (Ac_2).

<Step ST6>

In the operation of Step ST6, the oxygen-concentration restoration control unit (53) compares values (Ac_1/Ac_2) obtained by dividing the initial acidities (Ac_1) by the corresponding current acidities (Ac_2) with a predetermined upper reference value (Rv_2).

The acidity of perishables (7), such as fruits, decreases as the freshness is reduced. Therefore, it is possible to infer that, the larger the amount of reduction in the acidity of the perishables (7) is, the lower the freshness of the perishables (7) is. That is, it is possible to infer that, the larger the value of Ac_1/Ac_2 is, the larger the degree of reduction in the freshness.

Therefore, when Ac_1/Ac_2 is greater than or equal to the upper reference value (Rv_2), that is, Rv_2≤Ac_1/Ac_2, the oxygen-concentration restoration control unit (53) performs the operation of Step ST7. On the other hand, when Ac_1/Ac_2 is less than the upper reference value (Rv_2), that is, (Ac_1/Ac_2<Rv_2), the oxygen-concentration restoration control unit (53) performs the operation of Step ST8. Note that the upper reference value (Rv_2) of the present embodiment differs from the upper reference value (Rv_2) of the second embodiment.

<Step ST8>

In the operation of Step ST8, the oxygen-concentration restoration control unit (53) compares the values (Ac_1/Ac_2) obtained by dividing the initial acidities (Ac_1) by the corresponding current acidities (Ac_2) with a predetermined lower reference value (Rv_1) and the predetermined upper reference value (Rv_2).

Therefore, as in the description about Step ST6, it is possible to infer that, the larger the amount of reduction in the acidity of the perishables (7) is, the lower the freshness of the perishables (7) is. That is, it is possible to infer that, the smaller the value of Ac_1/Ac_2 is, the smaller the degree of reduction in the freshness.

Therefore, when Ac_1/Ac_2 is greater than the lower reference value (Rv_1) and less than the upper reference value (Rv_2), that is, Rv_1<Ac_1/Ac_2<Rv_2, the oxygen-concentration restoration control unit (53) performs the operation of Step ST9. On the other hand, when Ac_1/Ac_2 is less than or equal to the lower reference value (Rv_1), that is, Ac_1/Ac_2≤Rv_1, the oxygen-concentration restoration control unit (53) performs the operation of Step ST10. Note that the lower reference value (Rv_1) of the present embodiment differs from the lower reference value (Rv_1) of the second embodiment.

—Modification of Third Embodiment—

In the internal air adjustment device (40) of the present embodiment, each state indicator sensor (15) may be a sensor that measures the hardness of perishables (7).

An oxygen-concentration restoration control unit (53) of the present modification performs a predetermined operation by using measured values of the hardnesses of the perishables (7) measured by the state indicator sensors (15).

Specifically, in the operation of Step ST1 shown in the flowchart of FIG. 7, the oxygen-concentration restoration control unit (53) of the present modification causes the memory unit (54) to store the arithmetic mean of measured values of the three state indicator sensors (15) as initial hardnesses, and, in Step ST5 thereof, the oxygen-concentration restoration control unit (53) of the present modification causes the memory unit (54) to store the arithmetic mean of measured values of the three state indicator sensors (15) as current hardnesses. The oxygen-concentration restoration control unit (53) of the present modification performs the operations of Step ST6 and Step ST8 by using the initial hardnesses instead of the initial acidities (Ac_1) and the current hardnesses instead of the current acidities (Ac_2).

Other Embodiments

Modifications of the embodiments described above are described.

—Modification 1—

The internal air adjustment devices (40) of the respective embodiments above may each be constituted to increase the oxygen concentration of internal air by supplying corrected air produced in the body unit (41) to the load room (5) in the oxygen-concentration restoration operation. The internal air adjustment device (40) of the present modification controls the speed of increase in the oxygen concentration of internal air during the oxygen-concentration restoration operation by regulating one or both of the oxygen concentration and the flow rate of the corrected air that is supplied to the load room (5).

—Modification 2—

The transport container (1) in which the internal air adjustment device (40) of any of the embodiments and modifications above is mounted is not limited to a container for ship transportation, and may be a container for land transportation. Where these internal air adjustment devices (40) are to be installed is not limited to the transport container (1). That is, these internal air adjustment devices (40) may be installed in, for example, a refrigerated storage or an industrial-use refrigerator.

—Modification 3—

The internal air adjustment devices (40) of the respective embodiments and modifications are not limited to those that produce corrected air (low-oxygen-concentration air) by the PSA method.

The internal air adjustment devices (40) may each be constituted to produce corrected air (low-oxygen-concentration air) by using, for example, a gas separation membrane. The gas separation membrane has the characteristic that "the passing speed of nitrogen is higher than the passing speed of oxygen". The internal air adjustment device (40) of the present modification supplies, as corrected air, air that passed through the gas separation membrane and that has a high nitrogen concentration to the load room (5), and discharges air that has not passed through the gas separation membrane and that has a high oxygen concentration to the outside.

—Modification 4—

In the internal air adjustment devices (40) of the respective embodiments and the respective modifications, the oxygen-concentration restoration control unit (53) may be constituted to cause the internal air adjustment devices (40) to execute an oxygen-concentration restoration operation when a worker has input an oxygen-concentration restoration command. The oxygen-concentration restoration command is input to the controller (50) of the internal air adjustment device (40) as a result of a worker pressing an operation command button of an operation panel of the container refrigeration apparatus (20) or the internal air adjustment device (40).

When the present modification is applied to the internal air adjustment device (40) of the first embodiment, the oxygen-concentration restoration control unit (53) thereof performs the operations from Step ST5 to Step ST10 without performing the operations from Step ST1 to Step ST4 of FIG. 4. In this case, when an oxygen-concentration restoration command is input, the oxygen-concentration restoration control unit (53) reads the ethylene concentration of internal air measured by the state indicator sensor (15) in Step ST5. In addition, in accordance with the value of the ethylene concentration, the oxygen-concentration restoration control unit (53) selects one of three oxygen-concentration restoration operations having different speeds of increase in the oxygen concentration from each other (specifically, the oxygen-concentration restoration operation of Step ST7, Step ST9, or Step ST10) to cause the internal air adjustment device (40) to execute the selected oxygen-concentration restoration operation.

Similarly, when the present modification is applied to the internal air adjustment device (40) of the second embodiment, the oxygen-concentration restoration control unit (53) performs the operations from Step ST5 to Step ST10 without performing the operations from Step ST1 to Step ST4 of FIG. 6. When the present modification is applied to the internal air adjustment device (40) of the third embodiment, the oxygen-concentration restoration control unit (53) performs the operations from Step ST5 to Step ST10 without performing the operations from Step ST1 to Step ST4 of FIG. 7.

Although the embodiments and modifications have been described above, it will be understood that various changes in form and detail can be made without departing from the spirit and scope of the claims. The embodiments and the modifications above may be combined or replaced as appropriate as long as the object functions of the present disclosure are not impaired.

INDUSTRIAL APPLICABILITY

As described above, the present disclosure is useful for an internal air adjustment device.

REFERENCE SIGNS LIST

1 transport container (storage)
15 state indicator sensor (state detector)
40 internal air adjustment device
50 controller
60 GPS receiver (position detector)

The invention claimed is:

1. An internal air adjustment device that supplies low-oxygen-concentration air having an oxygen concentration lower than an oxygen concentration of external air of a storage to the storage, and that maintains an oxygen concentration of internal air of the storage in a target oxygen concentration range lower than a reference concentration, and
   that is constituted to perform an oxygen-concentration restoration operation of increasing the oxygen concentration of the internal air of the storage to the reference concentration from the target oxygen concentration range,
   the internal air adjustment device comprising:
   at least one pump connected to the storage;
   a valve between an interior of the storage to an exterior of the storage; and
   a controller that is configured to, in the oxygen-concentration restoration operation, regulate at least one of a flow rate and the oxygen concentration of the low-oxygen-concentration air that is supplied into the interior of the storage or a flow rate of the external air that is supplied into the interior of the storage by controlling the at least one pump and the valve,
   the controller being configured to regulate the at least one of the flow rate and the oxygen concentration of the low-oxygen-concentration air that is supplied into the interior of the storage or the flow rate of the external air that is supplied into the interior of the storage to cause a speed of increase in the oxygen concentration of the internal air to be less than or equal to a predetermined maximum speed.

2. The internal air adjustment device according to claim 1, wherein the storage is a transport container,
   wherein the internal air adjustment device includes a position detector that is configured to detect a position of the storage, and
   wherein the controller is configured to determine starting of the oxygen-concentration restoration operation by using the position of the storage detected by the position detector during transport of the storage.

3. The internal air adjustment device according to claim 1, wherein the storage is a transport container, and
   wherein the controller is configured to define, as at least one condition for starting the oxygen-concentration restoration operation, a condition regarding a time from when a supply of electric power to the internal air adjustment device has been stopped to when a supply of electric power to the internal air adjustment device is started again.

4. The internal air adjustment device according to claim 1, comprising:
   a state detector that is configured to detect a state indicator that indicates a state of a perishable stored in the storage,
   wherein the controller regulates the speed of increase in the oxygen concentration of the internal air in the oxygen-concentration restoration operation based on the state indicator detected by the state detector.

5. The internal air adjustment device according to claim 4, wherein the state detector is configured to detect, as the state indicator that indicates the state of the perishable, at least one of an ethylene concentration of the internal air, a sugar content of the perishable, an acidity of the perishable, and a hardness of the perishable.

6. The internal air adjustment device according to claim 1, wherein the oxygen-concentration restoration operation is performed before a door of the storage is opened.

7. An internal air adjustment device that supplies low-oxygen-concentration air having an oxygen concentration lower than an oxygen concentration of external air of a storage to the storage, and that maintains an oxygen concentration of internal air of the storage in a target oxygen concentration range lower than a reference concentration, and
   that is constituted to perform an oxygen-concentration restoration operation of increasing the oxygen concentration of the internal air of the storage to the reference concentration from the target oxygen concentration range,
   the internal air adjustment device comprising:
   at least one pump connected to the storage;
   a valve between an interior of the storage to an exterior of the storage; and
   a controller that is configured to, in the oxygen-concentration restoration operation, regulate at least one of a flow rate and the oxygen concentration of the lowoxygen-concentration air that is supplied into the interior of the storage or a flow rate of the external air that is supplied into the interior of the storage by controlling the at least one pump and the valve,
the oxygen-concentration restoration operation being performed before a door of the storage is opened.

* * * * *